United States Patent
Jang et al.

(10) Patent No.: US 7,242,568 B2
(45) Date of Patent: Jul. 10, 2007

(54) DISPLAY APPARATUS

(75) Inventors: Se-ki Jang, Suwon-si (KR); Man-yeob Lee, Suwon-si (KR); Ju-hwan Kim, Suwon-si (KR); Tai-hung Kim, Suwon-si (KR); Jun-su Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/244,086

(22) Filed: Oct. 6, 2005

(65) Prior Publication Data

US 2006/0098402 A1    May 11, 2006

(30) Foreign Application Priority Data

Nov. 8, 2004   (KR) .................. 10-2004-0090466

(51) Int. Cl.
*H01T 23/00* (2006.01)
*H05F 3/00* (2006.01)
*H02H 1/00* (2006.01)
*H02H 1/04* (2006.01)

(52) U.S. Cl. .............. 361/230; 361/231; 361/212; 361/213

(58) Field of Classification Search .......... 361/230, 361/231, 212, 213
See application file for complete search history.

(56) References Cited

U.S. PATENT DOCUMENTS

| | | |
|---|---|---|
| 3,469,031 A | 9/1969 | Setchell |
| 5,574,619 A | 11/1996 | Jeong |
| 5,576,923 A | 11/1996 | Park |
| 5,654,886 A | 8/1997 | Zereski, Jr. et al. |
| 7,031,134 B2 * | 4/2006 | Izumi et al. ............. 361/231 |
| 2003/0137794 A1 | 7/2003 | Izumi et al. |

FOREIGN PATENT DOCUMENTS

| | | |
|---|---|---|
| JP | 2004-24933 | 1/2004 |
| JP | 2004-89885 | 3/2004 |
| KR | 1995-0022896 | 7/1995 |
| KR | 97-006561 | 4/1997 |
| KR | 97-007475 | 5/1997 |
| KR | 10-0274877 | 12/2000 |
| KR | 10-2005-0098060 | 10/2005 |

OTHER PUBLICATIONS

International Search Report.

* cited by examiner

*Primary Examiner*—Stephen W. Jackson
*Assistant Examiner*—Dharti H. Patel
(74) *Attorney, Agent, or Firm*—Stanzione & Kim, LLP (57) ABSTRACT

A display apparatus includes a display module to display a picture, a casing placed around the display module, an anion generating unit including a plurality of electrodes provided inside the casing to generate anions and an electrode housing to accommodate the plurality of electrodes and formed with an opening opened in a predetermined direction to radiate the anions, and an anion cover provided at the casing in contact with the opening of the electrode housing and formed with an anion outlet to communicate with the opening of the electrode housing. Thus, the display apparatus can prevent electromagnetic waves from coming out through the anion outlet.

39 Claims, 5 Drawing Sheets

DISPLAY APPARATUS

CROSS-REFERENCE TO RELATED APPLICATIONS

This application claims the benefit under 35 U.S.C. § 119 of Korean Patent Application No. 2004-90466, filed on Nov. 8, 2004, in the Korean Intellectual Property Office, the disclosure of which is incorporated herein in its entirety by reference.

BACKGROUND OF THE INVENTION

1. Field of the Invention

The present general inventive concept relates to a display apparatus, and more particularly, to a display apparatus provided with an anion generator.

2. Description of the Related Art

Generally, a display apparatus comprises a display main body to display a picture, and a base supporting the display main body with respect to an installation surface, such as a table or the like, to support the display main body. Here, the display apparatus collectively includes a television, a computer monitor, etc.

Recently, the display main body has employed a display module shaped like a thin plate, such as a liquid crystal display (LCD) or a plasma display panel (PDP).

Further, the display apparatus has been provided with an anion generator to generate anions, which are good to a human body.

For example, a conventional display apparatus provided with an anion generator is disclosed in Japanese Patent First Publication No. 2004-24933. The conventional display apparatus comprises the anion generator placed inside a casing and generating the anions, a power switch to turn on/off the anion generator, and an anion outlet formed on the casing and through which the anions generated from the anion generator are exhaled, thereby providing a user with the anions.

However, the conventional display apparatus is formed with the anion outlet to radiate the anions generated from the anion generator externally, so that electromagnetic waves generated by the display apparatus within the casing may come out through the anion outlet. Further, in the conventional display apparatus, the anions generated by the anion generator may accumulate at the anion outlet due to dielectric polarization while passing through the anion outlet, so that the anions may not be smoothly radiated externally.

SUMMARY OF THE INVENTION

Accordingly, the present general inventive concept provides a display apparatus, which can prevent electromagnetic waves from coming out through an anion outlet.

The present general inventive concept also provides a display apparatus, which can smoothly radiate anions through an anion outlet.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a display apparatus comprising a display module to display a picture and a casing placed around the display module, and further comprising an anion generating unit comprising a plurality of electrodes provided inside the casing to generate anions, and an electrode housing to accommodate the plurality of electrodes and formed with an opening opened in a predetermined direction to radiate the anions, and an anion cover provided at the casing to contact the opening of the electrode housing, and formed with an anion outlet to communicate with the opening of the electrode housing.

The electrode housing may be coupled to a back of the casing and in contact with a back of the anion cover.

The anion cover may be provided at a front of the casing to radiate the anions in a frontward direction with respect to the display module.

The anion cover may include a charge-prevention material.

The display apparatus may further comprise a connector to electrically connect a ground electrode of the plurality of electrodes with the anion cover.

The connector may have a first end connected to the ground electrode, and a second end elastically contacting the back of the anion cover.

The foregoing and/or other aspects and advantages of the present general inventive concept may also be achieved by providing a display apparatus comprising a display module to display a picture and a casing placed around the display module, and further comprising an anion generating unit comprising a plurality of electrodes provided inside the casing to generate anions, an anion cover provided at the casing and formed with an anion outlet through which the anions generated from the anion generating unit are radiated, and a connector to electrically connect a ground electrode of the plurality of electrodes with the anion cover.

The foregoing and/or other aspects and advantages of the present general inventive concept may also be achieved by providing a display apparatus comprising a display module to display a picture, a base, and a casing placed around the display module, and further comprising an anion generating unit comprising a plurality of electrodes provided inside the base to generate anions, an anion cover provided at the base and formed with an anion outlet through which the anions generated from the anion generating unit are radiated, and a connector to electrically connect a ground electrode of the plurality of electrodes with the anion cover.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

FIGS. 1 through 5 illustrate a display apparatus 1 provided with an anion generating unit 30, according to an embodiment of the general inventive concept. Referring to FIGS. 1–5, the display apparatus 1 comprises a display main body 10 to display a picture, a base 5 to support the display main body 10 against an installation surface, the anion generating unit 30 provided in the display main body 10 to generate anions, and an anion cover 40 provided at the display main body 10 and formed with an anion outlet 41 through which the anions generated from the anion generating unit 30 are radiated externally. Further, the display apparatus 1 can comprise a connector 50 to electrically connect a ground electrode 35 of the anion generating unit 30 (to be described later) to the anion cover 40.

The display main body 10 comprises a display module 15 to display a picture, a casing comprising a front casing 11 and a back casing 18 (together referred to as casing) placed together and around the display module 15 to form an outer appearance of the display main body 10, and a driving circuitry 21 placed within the front and back casing 11 and 18 to drive the display module 15.

The display module 15 can have a thin plate shape, and can be an LCD (liquid crystal display) or a PDP (plasma display panel). Alternatively, the display module 15 may have various shapes and be a cathode ray tube (CRT), etc.

The front casing 11 is disposed at a front of the display module 15, and the back casing 18 is disposed at a back of the display module 15.

The front casing 11 is formed with a cover coupling portion 13 (FIG. 3) penetratingly formed to couple with the anion cover 40. Further, the front casing 11 can be provided with an anion light emitting diode (LED) 25 (FIG. 1) disposed adjacent to the cover coupling portion 13 to indicate an on/off state of the anion generating unit 30. Further, the front casing 11 can comprise a power switch 27 to turn on/off the display module 15, and a power LED 28 to indicate an on/off state of the display module 15. Further, on a rear portion of the front casing 11 can be provided a plurality of coupling bosses 12 (FIG. 3) to which an electrode housing 37 (to be described later) can be coupled, and an LED substrate 23 (FIG. 2) connected to and driving the anion LED 25 and the power LED 28.

Figure 1:
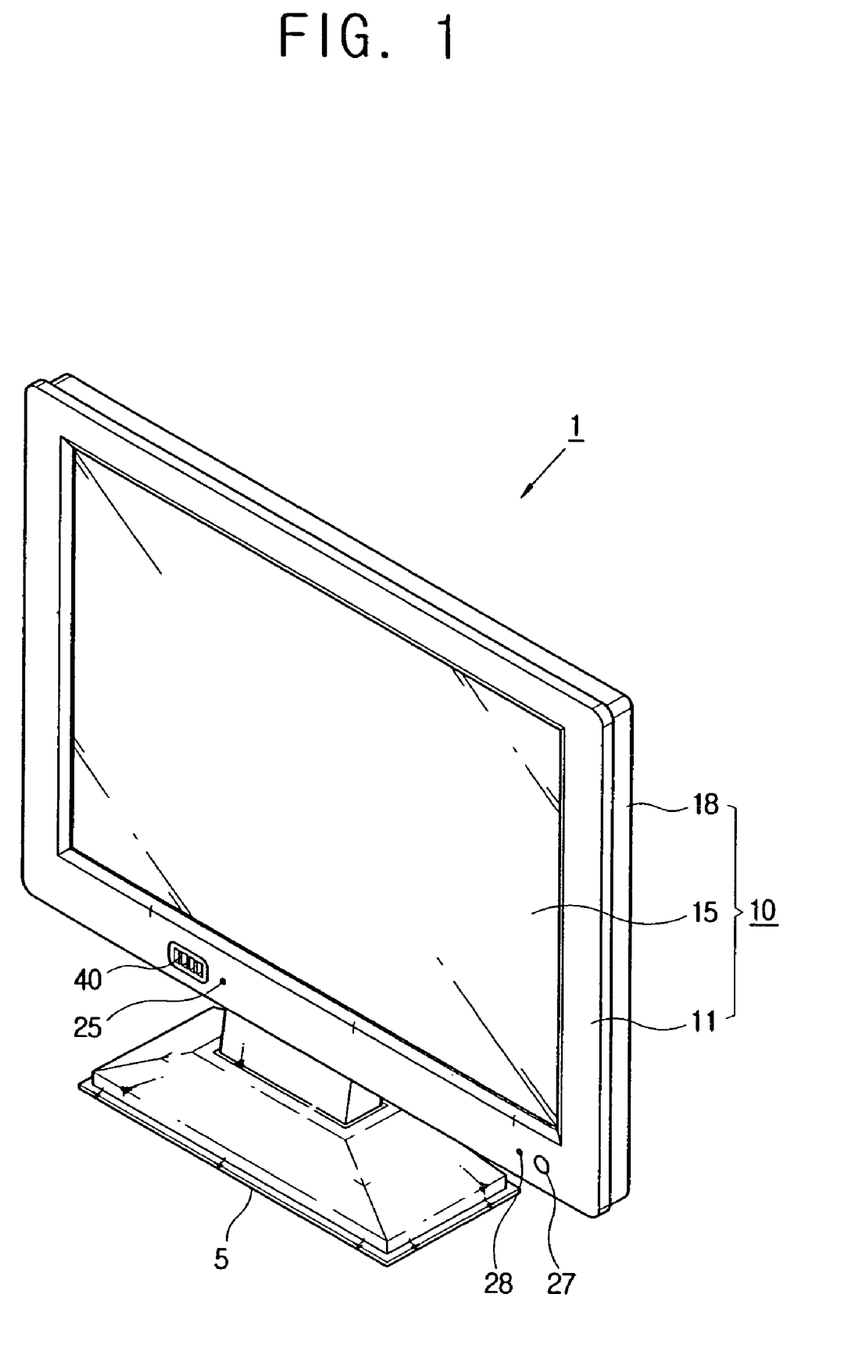
FIG. 1 is a perspective view of a display apparatus according to an embodiment of the present general inventive concept.
Figure 2:
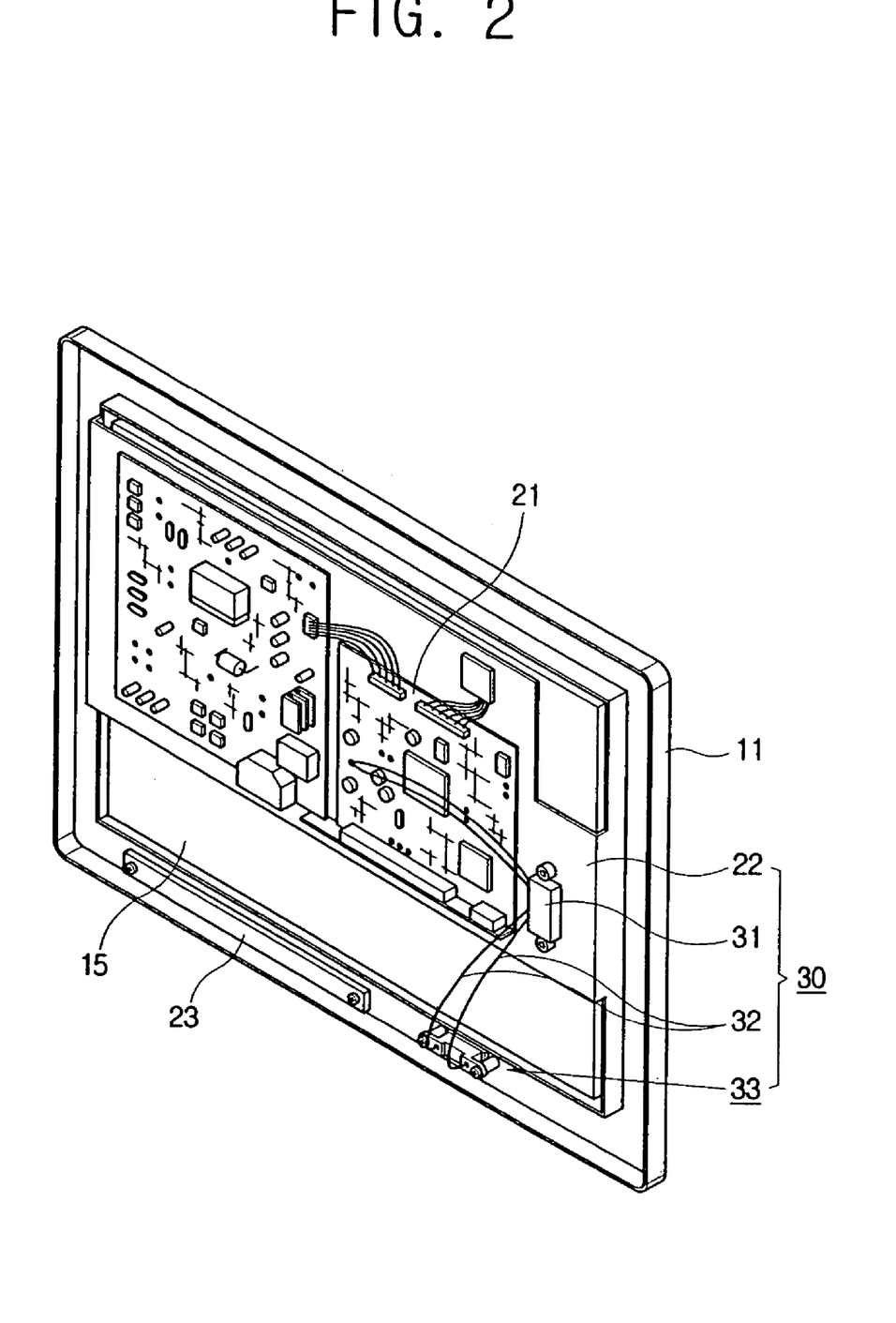
FIG. 2 is a perspective view of an anion generator provided in the display apparatus of FIG. 1.
Figure 3:
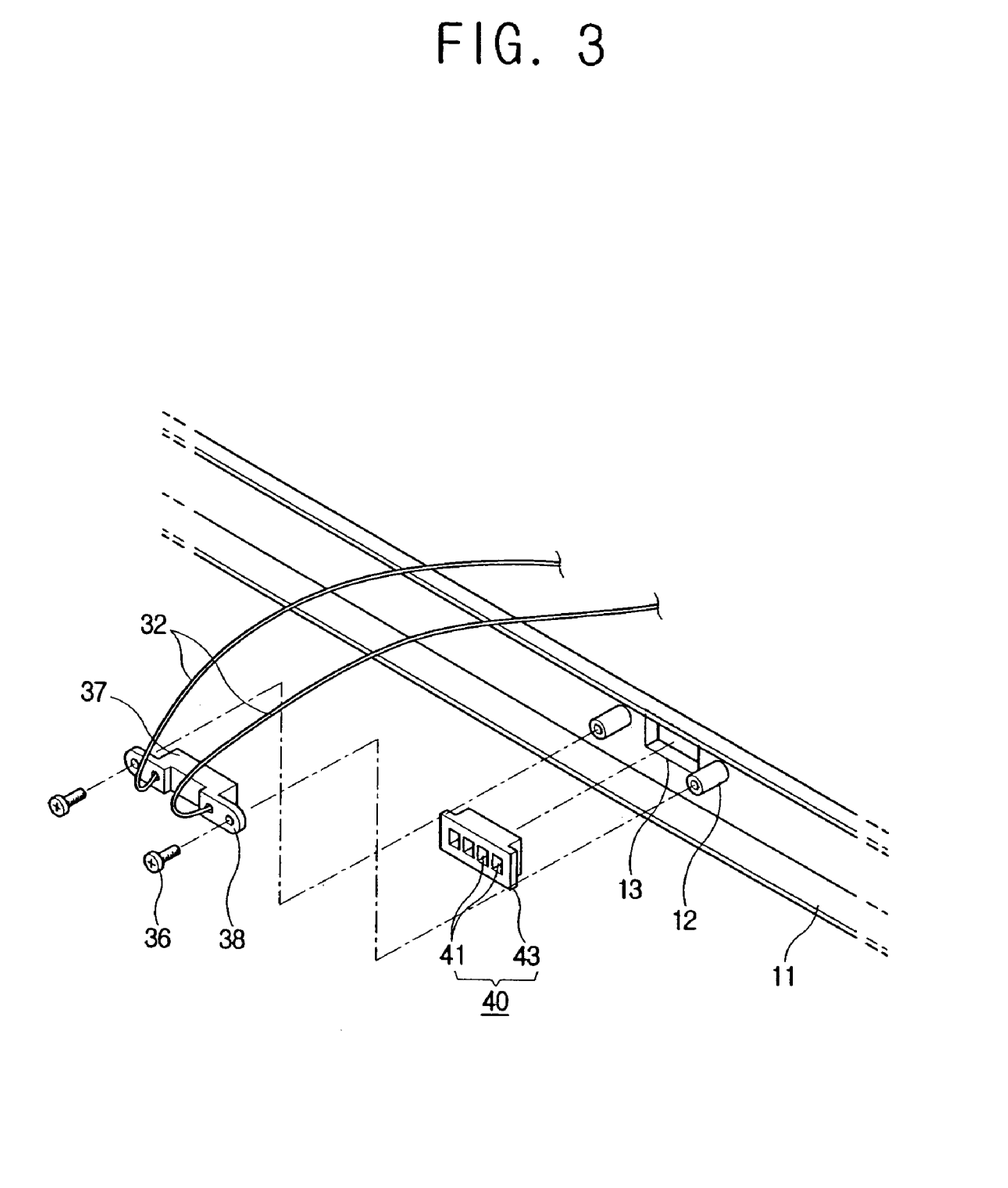
FIG. 3 is a partially exploded perspective view of the anion generator of FIG. 2.

Referring to FIG. 2, the driving circuitry 21 can be supported by a circuitry supporter 22 disposed behind the display module 15 and coupled to the rear portion of the front casing 11. The driving circuitry 21 receives external power and thus drives and controls the display module 15, the LED substrate 23, etc. The driving circuitry 21 can be connected to a high voltage generator 31 provided in the anion generating unit 30 (to be described later) through a cable 32 to thereby supply power to the high voltage generator 31.

The anion generating unit 30 comprises the high voltage generator 31 to generate power of a high voltage using the power supplied by the driving circuitry 21, and an anion generator 33 to receive the high voltage power generated from the high voltage generator 31 and to generate anions using the high voltage power. The anion generating unit 30 can be disposed inside the casing, but is not limited thereto, and may alternatively be disposed, for example, in the base 5. Further, the anion generating unit 30 can be set to operate by the driving circuitry 21 or the like when a user turns on the power switch 27 to turn on the display module 15 and supply the external power to the driving circuitry 21 of display apparatus 1. Alternatively, the anion generating unit 30 may be turned on/off separately from the display module 15.

The high voltage generator 31 can be coupled to and supported by the circuitry supporter 22 disposed behind the display module 15. The high voltage generator 31 can be coupled to and supported by the circuitry supporter 22 with a screw or another coupling device that performs the intended coupling operation. Alternatively, the high voltage generator 31 can be coupled to a separate bracket or directly coupled to the casing. The high voltage generator 31 can generate a voltage of about 4,000V, but is not limited to 4,000V, and may generate various voltages of substantially 1,000V through 10,000V. The high voltage generator 31 can be connected to the driving circuitry 21 through the cable 32 to receive the power, but can alternatively receive power from a separate power supply. Further, the high voltage generator 31 is connected to electrodes 34 and 35 of the anion generator 33 (to be described later) through a cable 32.

The anion generator 33 comprises a plurality of electrodes 34 and 35 placed inside the casing to generate the anions, and the electrode housing 37 to accommodate the plurality of electrodes 34 and 35 and having an opening 39 opened in a predetermined direction to radiate the anions therethrough.

The plurality of electrodes 34 and 35 are connected to the high voltage generator 31 through the cable 32, and supported by the electrode housing 37 to be separated from each other. The plurality of electrodes 34 and 35 comprises a high voltage electrode 34 to which a negative (−) power is applied, and the ground electrode 35 separated from the high voltage electrode 34 and to which a positive (+) power is applied.

Figure 4:
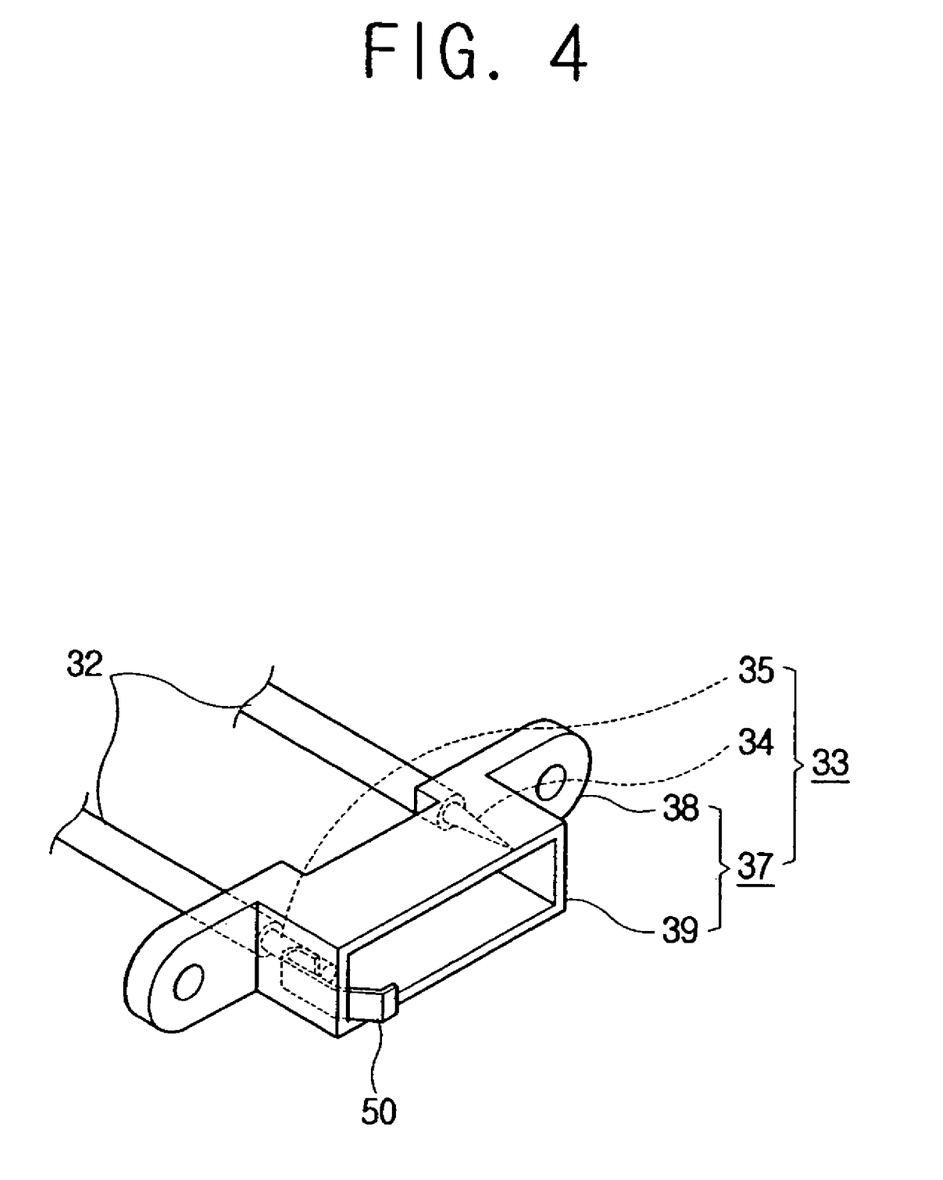
FIG. 4 is a partial perspective view of the anion generator of FIG. 2.
Figure 5:
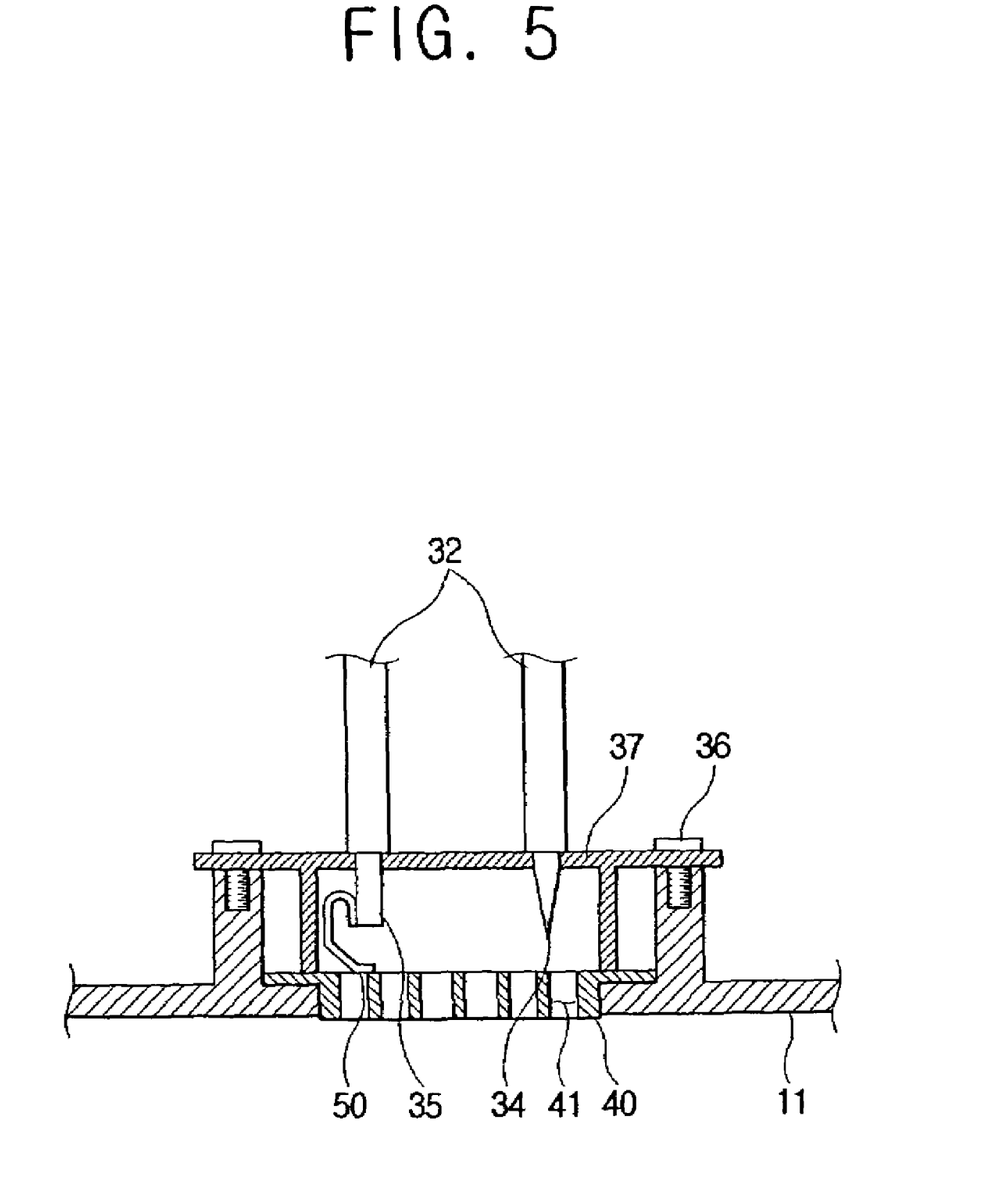
FIG. 5 is a partial section view of the anion generator of FIG. 2.

Thus, the anions are generated by an electric discharge between the high voltage electrode 34 and the ground electrode 35. Referring to FIG. 4, the high voltage electrode 34 can be inserted into the electrode housing 37 from a back portion thereof toward the opening 39. Alternatively, the high voltage electrode 34 may be variously disposed in the electrode housing 37, for example, inserted into the electrode housing 37 from a first side toward a second side. The high voltage electrode 34 can have a pointed tip, but is not limited thereto.

The ground electrode 35 can be spaced from and disposed in parallel with the high voltage electrode 34. Alternatively, the ground electrode 35 may be variously disposed in the electrode housing 37, for example, inserted into the electrode housing 37 from the second side toward the first side.

The electrode housing 37 accommodates the high voltage electrode 34 and the ground electrode 35, and forms a discharging space in which the anions are generated due to the electric discharge between the high voltage electrode 34 and the ground electrode 35. The electrode housing 37 can be connected to the rear of the front casing 11 so as to contact a back portion of the anion cover 40. Further, the electrode housing 37 is formed with a housing coupler 38 (FIGS. 3–4) to couple with the coupling boss 12 provided at the rear of the front casing 11, to thereby allow the opening 39 to contact the back portion of the anion cover 40. The housing coupler 38 can be coupled with the coupling boss 12 by a screw 36 or the like. Thus, the opening 39 of the electrode housing 37 is in contact with the back of the anion cover 40 so that electromagnetic waves generated in the driving circuitry 21, or other components provided in the casing, are prevented from leaking out through the anion cover 40.

The anion cover 40 comprises the anion outlet 41 to communicate with the opening 39 of the electrode housing 37, and a cover supporter 43 coupled to a rear edge of the cover coupling portion 13 to prevent the anion cover 40 from breaking away in a frontward direction from the cover coupling portion 13 of the front casing 11. The anion cover 40 can be disposed at a front portion of the front casing 11 to thereby radiate the anions in a frontward direction with respect to the display module 15. That is, the cover coupling portion 13, in which the anion cover 40 is accommodated and coupled can be provided at the front portion of the front casing 11. Further, the anion cover 40 can include a charge-prevention material. Here, the anion cover 40 can be formed by injection-molding a plastic resin, and the plastic resin may contain the charge-prevention material so as to prevent the anions generated from the anion generator 33 from attaching to the anion cover 40. If the anion cover 40 does not contain the charge-prevention material, the anions are likely to attach to the anion cover 40 due to dielectric polarization. In the case where a large quantity of anions attach to the anion cover 40, the accumulated anions interfere with the anions passing through the anion cover 40. Therefore, the anion cover 40 can contain the charge-prevention material to prevent the anions from attaching to the anion cover 40 and to easily discharge the attached anions through the connector 50. Here, the anion cover 40 can be inserted in the cover coupling portion 13 of the front casing 11 in a direction from the back portion to the front portion. Alternatively, the anion cover 40 may be inserted in the cover coupling portion 13 of the front casing 11 in a direction from the front portion to the back portion, and then coupled by an adhesive or hot sealing.

The anion outlet 41 communicates with the opening 39 of the electrode housing 37 and allows the anions generated due to the electric discharge between the electrodes to be radiated therethrough. Here, the anions generated due to the electric discharge are radiated outward through the anion outlet 41 by natural convection.

The cover supporter 43 can be coupled to the rear edge of the cover coupling portion 13 by an adhesive. Alternatively, the cover supporter 43 can be coupled to the rear edge of the cover coupling portion 13 by hot sealing, a screw, or the like.

The connector 50 is made of a conductive material to electrically connect the ground electrode 35 with the anion cover 40 to thereby allow the anions attached onto the anion cover 40 to move from the anion cover 40 to the ground electrode 35. Here, the connector 50 has a first end connected to the ground electrode 35, and a second end made of an elastic material elastically contacting the back of the anion cover 40. For example, the connector 50 can be made of a metal piece having good conductivity and elasticity.

As described above, the display apparatus 1 of FIGS. 1–5 is operated as follows.

When a user turns on the display apparatus 1 through the power switch 27, the driving circuitry 21 supplies the power to the high voltage generator 31 to thereby apply the high voltage power from the high voltage generator 31 to the electrodes 34 and 35. Then, the high voltage power applied to the electrodes 34 and 35 causes the electric discharge to thereby generate the anions.

On the other hand, when the display apparatus 1 is turned off, the power is no longer supplied from the driving circuitry 21 to the high voltage generator, and the electrodes 34 and 35 stop generating the anions.

Thus, a display apparatus according to an embodiment of the present general inventive concept comprises an anion generating unit comprising a plurality of electrodes provided in a casing to generate anions, and an electrode housing to accommodate the plurality of electrodes and form an opening opened in a predetermined direction to radiate the anions, and an anion cover provided at the casing to contact the opening of the electrode housing, and formed with the anion outlet to communicate with the opening of the electrode housing so that the opening of the electrode housing is in contact with the back of the anion cover to thereby prevent electromagnetic waves generated by a driving circuitry or the like provided in the casing from leaking out through the anion cover.

Further, the display apparatus according to an embodiment of the present general inventive concept comprises a connector to electrically connect a ground electrode with the anion cover, so that the anions attached onto the anion cover are easily discharged via the connector to thereby allow the anions to easily pass through the anion outlet of the anion cover.

As described above, the present general inventive concept provides a display apparatus, in which an opening of the electrode housing is in contact with the back of an anion cover, so that electromagnetic waves generated in the casing are prevented from coming out through the anion cover.

Further, the present general inventive concept provides a display apparatus comprising a connector to electrically connect a ground electrode with an anion cover so that anions attached onto the anion cover are easily discharged via the connector to thereby allow the anions to easily pass through the anion outlet of the anion cover.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising a display module to display a picture, and a casing placed around the display module, and further comprising:
   an anion generating unit comprising a plurality of electrodes provided inside the casing to generate anions, and an electrode housing to accommodate the plurality of electrodes and formed with an opening opened in a predetermined direction to radiate the anions; and
   an anion cover provided at the casing and formed with an anion outlet to communicate with the opening of the electrode housing to radiate the anions externally of the display apparatus, the anion cover in contact with the opening of the electrode housing to prevent electromagnetic waves generated in the display apparatus from leaving the display apparatus through the anion outlet of the anion cover.

2. The display apparatus according to claim 1, wherein the electrode housing is coupled to an inside of the casing and in contact with a back portion of the anion cover.

3. The display apparatus according to claim 1, wherein the anion cover is provided in a front portion of the casing to radiate the anions in a frontward direction with respect to the display module.

4. The display apparatus according to claim 1, wherein the anion cover includes a charge-prevention material.

5. The display apparatus according to claim 4, further comprising a connector to electrically connect a ground electrode of the plurality of electrodes with the anion cover.

6. The display apparatus according to claim 5, wherein the connector has a first end connected to the ground electrode, and a second end elastically contacting a back portion of the anion cover.

7. The display apparatus according to claim 1, further comprising a connector to electrically connect a ground electrode of the plurality of electrodes with the anion cover.

8. The display apparatus according to claim 7, wherein the connector has a first end connected to the ground electrode, and a second end elastically contacting a back portion of the anion cover.

9. The display apparatus according to claim 1, further comprising;
a high voltage generator to supply a high voltage to the plurality of electrodes of the anion generating unit.

10. The display apparatus according to claim 1, wherein the plurality of electrodes comprises a high voltage electrode and a ground electrode, and the anions are generated by an electric discharge between the high voltage electrode and the ground electrode.

11. A display apparatus comprising a display module to display a picture, and a casing placed around the display module, and further comprising:
an anion generating unit comprising a plurality of electrodes provided inside the casing to generate anions;
an anion cover provided at the casing and formed with an anion outlet through which the anions generated from the anion generating unit are radiated; and
a connector to electrically connect a ground electrode of the plurality of electrodes with the anion cover.

12. The display apparatus according to claim 11, wherein the anion cover includes a charge-prevention material.

13. The display apparatus according to claim 11, wherein the connector has a first end connected to the ground electrode, and a second end elastically contacting a back portion of the anion cover.

14. A display apparatus comprising a display module to display a picture, a base, and a casing placed around the display module, and further comprising:
an anion generating unit comprising a plurality of electrodes provided inside the base to generate anions;
an anion cover provided at the base and formed with an anion outlet through which the anions generated from the anion generating unit are radiated; and
a connector to electrically connect a ground electrode of the plurality of electrodes with the anion cover.

15. The display apparatus according to claim 14, wherein the anion cover includes a charge-prevention material.

16. The display apparatus according to claim 14, wherein the connector has a first end connected to the ground electrode, and a second end elastically contacting a back portion of the anion cover.

17. A display apparatus comprising:
a display main body to display an image;
a base to support the display main body; and
an anion generating unit provided in one of the display main body and the base, and comprising:
an anion generator to generate anions, and
an anion outlet extending through the one of the display main body and the base in which the anion generator is provided to radiate the anions externally thereof,
wherein the one of the display main body and the base comprises an opening to accommodate the anion outlet, and the anion outlet fits within the opening to prevent electromagnetic waves of the one of the display main body and the base from passing through the opening.

18. The display apparatus according to claim 17, wherein the anion generator comprises:
a plurality of electrodes to generate the anions; and
an electrode housing contacting the anion outlet to surround the plurality of electrodes between the electrode housing and the anion outlet to allow only the anions to pass through the anion outlet.

19. The display apparatus according to claim 18, wherein the plurality of electrodes comprises a high voltage electrode and a ground electrode, and the anions are generated by an electric discharge between the high voltage electrode and the ground electrode.

20. The display apparatus according to claim 19, wherein the high voltage electrode and the ground electrode protrude from a back portion of the electrode housing toward the anion outlet.

21. The display apparatus according to claim 18, further comprising:
a high voltage generator electrically connected to the plurality of electrodes of the anion generator to supply a high voltage to the plurality of electrodes.

22. The display apparatus according to claim 21, wherein the high voltage generator generates a voltage within a range of substantially 1,000V to 10,000V.

23. The display apparatus according to claim 17, further comprising:
an anion LED (light emitting diode) to indicate an on/off state of the anion generating unit.

24. The display apparatus according to claim 17, wherein the anion generating unit is turned on/off when the display main body is turned on/off.

25. The display apparatus according to claim 17, wherein the anion outlet comprises a charge prevention material to prevent the anions from accumulating at the anion outlet.

26. The display apparatus according to claim 17, wherein the anion generating unit further comprises:
a connector to electrically connect the anion outlet to a ground of the anion generator to transfer anions attached to the anion outlet to the ground.

27. The display apparatus according to claim 26, wherein the connector comprises a conductive material.

28. The display apparatus according to claim 17, wherein the anions are radiated through the anion outlet due to a natural convection.

29. The display apparatus according to claim 17, wherein the anion outlet is disposed at a front portion of the one of the display main body and the base to radiate the anions outward from the front portion of the one of the display main body and the base.

30. An anion generation unit usable with a display apparatus, comprising:
an electrode housing connectable to an inner portion of the display apparatus and comprising an opening at one end and a plurality of electrodes therein to generate anions; and
an anion cover extendable through a casing of the display apparatus at one end and connectable to the opening of the electrode housing at another end to receive and emit the anions externally of the display apparatus.

31. The anion generation unit according to claim 30, further comprising:
a connector extending from the anion cover to connect with a ground electrode of the plurality of electrodes.

32. The anion generation unit according to claim 30, wherein the anion cover is formed of a charge-prevention material.

33. The anion generation unit according to claim 30, wherein the anion cover comprises at least one anion outlet extending therethrough to receive the anions from the plurality of electrodes and to emit the anions externally of the display apparatus.

34. The anion generation unit according to claim 33, wherein the anion cover further comprises:
a cover supporter coupled to a rear edge thereof to contact an inner portion of the casing of the display apparatus to prevent the anion cover from breaking therethrough.

35. The anion generation unit according to claim 30, wherein the electrode housing further comprises:
coupling members at opposite sides thereof to couple the electrode housing to the inner portion of the display apparatus such that the electrode housing forms a seal with the anion cover to prevent electromagnetic waves from being emitted through the anion cover.

36. The display apparatus according to claim 1, wherein the casing includes a hole extending through the display apparatus and having a first end facing an inside of the display apparatus and a second end facing an outside of the display apparatus, the anion cover is located in the hole of the casing, and the electrode housing completely covers the end of the hole facing the inside of the display apparatus and the anion cover therein to prevent the electromagnetic waves generated in the display apparatus from leaving the display apparatus through the anion outlet of the anion cover.

37. The display apparatus of claim 11, further comprising:
an electrode housing to accommodate the plurality of electrodes and formed with an opening opened in a predetermined direction to radiate the anions through the anion cover, the anion cover in contact with the opening of the electrode housing to prevent electromagnetic waves generated in the display apparatus from leaving the display apparatus through the anion outlet of the anion cover.

38. The display apparatus of claim 14, further comprising:
an electrode housing to accommodate the plurality of electrodes and formed with an opening opened in a predetermined direction to radiate the anions through the anion cover, the anion cover in contact with the opening of the electrode housing to prevent electromagnetic waves generated in the display apparatus from leaving the display apparatus through the anion outlet of the anion cover.

39. The anion generation unit according to claim 30, wherein the one end of the anion cover is disposed in the opening of the electrode housing and the electrode housing contacts the one end of the anion outlet to prevent electromagnetic waves generated in the display apparatus from passing through the anion cover.

* * * * *